United States Patent
Jenkinson

[11] Patent Number: 5,858,458
[45] Date of Patent: Jan. 12, 1999

[54] MIRRORS AND THEIR PRODUCTION

[75] Inventor: Timothy Jenkinson, Wigan, United Kingdom

[73] Assignee: Pilkington United Kingdom Limited, St. Helens, United Kingdom

[21] Appl. No.: 657,101

[22] Filed: Jun. 3, 1996

[30] Foreign Application Priority Data

Jun. 10, 1995 [GB] United Kingdom .................. 9511841

[51] Int. Cl.$^6$ ........................................ B05D 5/06
[52] U.S. Cl. ........................ 427/167; 65/60.2; 65/60.5; 427/166; 427/255.7; 427/419.2; 427/419.3
[58] Field of Search .................................... 427/166, 255, 427/165, 167, 255.7, 419.2, 419.3; 65/60.2, 60.5

[56] References Cited

U.S. PATENT DOCUMENTS

| | | | |
|---|---|---|---|
| 4,469,045 | 9/1984 | Chesworth | 118/718 |
| 4,504,526 | 3/1985 | Hofer et al. | 427/255 |
| 4,661,381 | 4/1987 | Callies et al. | 427/255 |
| 4,673,248 | 6/1987 | Taguchi et al. | 350/166 |
| 5,065,696 | 11/1991 | Greenberg et al. | 118/718 |
| 5,505,989 | 4/1996 | Jenkinson | 118/718 |

FOREIGN PATENT DOCUMENTS

| | | |
|---|---|---|
| 0 583 871 A1 | 2/1994 | European Pat. Off. . |
| 1 507 996 | 4/1978 | United Kingdom . |
| WO 95/18773 | 7/1995 | WIPO . |
| WO 95/18774 | 7/1995 | WIPO . |

Primary Examiner—Terressa Mosley
Attorney, Agent, or Firm—Howrey & Simon

[57] ABSTRACT

The green reflection color of back surface mirrors produced by deposition of a reflecting layer over two reflection enhancing layers on a glass substrate is controlled by selection of the layer materials and thicknesses to provide a reflection color having an a* value greater than −6, with a light reflection of at least 65%, preferably at least 70%. The inner reflection enhancing layer and reflecting layer are preferably of silicon, with the inner reflection enhancing layer having an optical thickness less than 125 nm; the intermediate reflection enhancing layer, which may be of silicon oxide, preferably has an optical thickness greater than 125 nm. The mirror may be produced by depositing the successive layers on a hot ribbon of glass during the glass production process.

14 Claims, 2 Drawing Sheets

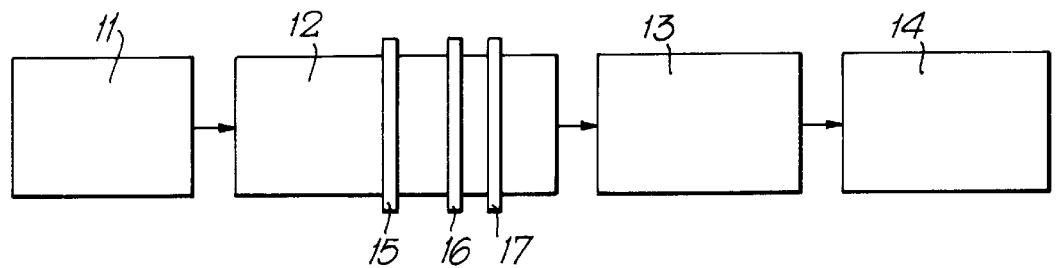
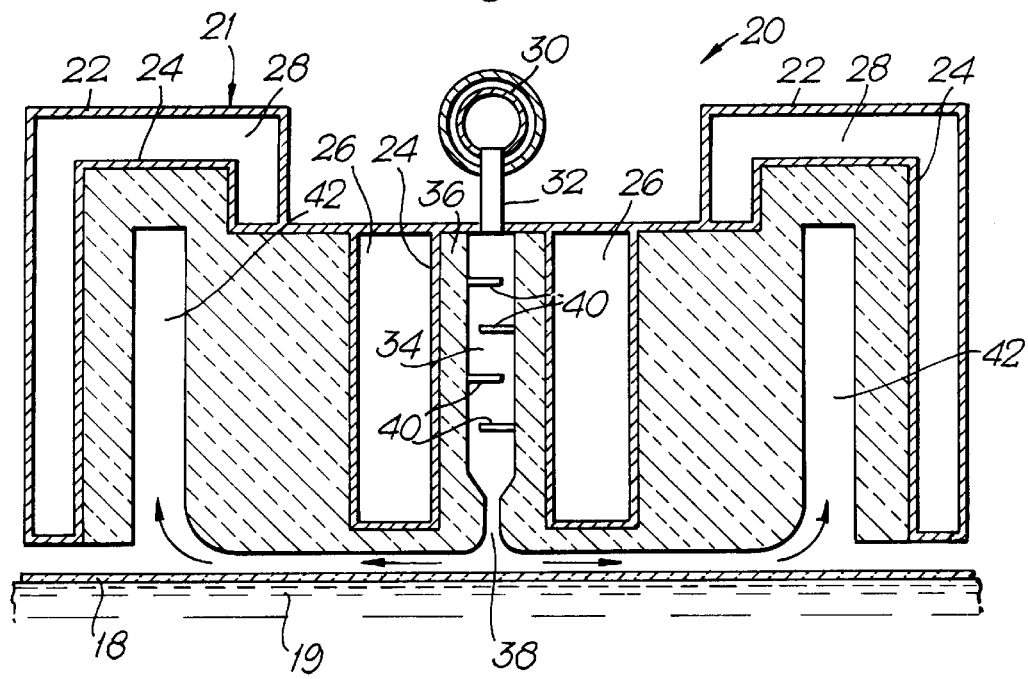

MIRRORS AND THEIR PRODUCTION

BACKGROUND OF THE INVENTION

The invention relates to mirrors and to a method of producing mirrors.

European patent specification EP 0 583 871 A1 describes a method of producing mirrors by applying a coating comprising a reflecting layer and at least two reflection enhancing layers to a ribbon of hot glass, for example a ribbon of float glass, during the glass production process. The layer furthest from the source of light to be reflected in use is regarded as the reflecting layer, with the reflection enhancing layers being between the light source and the reflection layer.

The reflecting layer may be a layer of high refractive index, for example silicon, a silicon oxide having a refractive index of at least 1.9, tantalum oxide, tin oxide or titanium oxide, with the reflection enhancing layers being alternatively of relatively low refractive index and high refractive index. A reflection enhancing layer of high refractive index may be, for example, of any of the high refractive index materials listed above for the reflecting layer. However, since silicon has a higher absorption for visible light than the metal oxides listed, it is generally preferred, according to the teaching of EP 0 583 871 A1, to use, for a back surface mirror, a metal oxide layer as the high refractive index inner reflection enhancing layer in order to achieve the required high visible light reflection. Thus, in a preferred structure for a back surface mirror, the arrangement of layers is glass
inner (reflection enhancing) layer of metal oxide
intermediate (reflection enhancing) layer of relatively low refractive index
outer (reflecting) layer of silicon.

The reflection enhancing layer of low refractive index may be of silicon oxide having a refractive index lower than that of the reflecting layer and that of the high refractive index reflection enhancing layer and in any event less than two.

At least the reflection enhancing layers are formed of layers of very approximately $n\lambda/4$ thickness, wherein n is an odd integer (preferably 1) and $\lambda$ is a wavelength of light in the visible region of the spectrum, such that the layers act to enhance the reflection by an interference effect.

Mirrors in accordance with the invention of EP 0 583 871A1 have a number of important advantages over conventional mirrors. Not only can they be produced by applying the reflecting coating to the glass during the glass production process (so avoiding the need for a separate off-line process to apply the reflecting coating), but the coating layers may be applied by pyrolytic processes (e.g. chemical vapour deposition) utilising the heat of the glass to produce pyrolytic coatings of high durability. However, there is a tendency for the mirrors to exhibit a reflection colour which is significantly more green than a conventional mirror. This tendency to a green reflection generally increases with increased reflection (as the thickness of the layers, especially the reflection enhancing layers, more closely approximates to $n\lambda/4$, where $\lambda$ is the wavelength of light towards the middle of the visible region of the spectrum). Moreover, it is especially significant in back surface mirrors where most of the reflected light passes twice through the thickness of the glass which may impart a green tint to transmitted light as a result of the presence of ferrous iron in the glass.

SUMMARY OF THE INVENTION

The present inventor has now found that, through careful selection of the thicknesses and refractive indices of the individual layers of the mirror coating, a back surface mirror having a visible light reflection of at least 65%, and, in preferred embodiments, at least 70% and a reflection colour having an a* value of greater than −6 may be produced.

According to the present invention, there is provided a back surface mirror comprising a glass substrate carrying a reflecting coating comprising a reflecting layer and at least two reflection enhancing layers, the thicknesses and refractive indices of the layers of the coating being selected to provide a visible light reflection of at least 65% and a reflection colour having an a* value greater than −6.

The expression "visible light reflection", as used in the present specification and claims, refers to the percentage of light reflected under Illuminant D65 source 1931 Observer Conditions. The reflection colours referred to in the present specification and claims and defined in terms of a* and/or b* values are colours defined in accordance with the CIE system (ASTM Designation: E 308–85), and, as quoted, are measured using Illuminant D65 source 1931 Observer Conditions.

Back surface mirrors according to the invention preferably have a visible light reflection of at least 73%.

Back surface mirrors according to the invention preferably have a reflection colour having an a* value greater than −5.

The glass substrate may be of float glass and will normally, but not necessarily, have a thickness greater than about 2 mm and less than about 12 mm. For most applications requiring significant mirror areas, the glass will have a nominal thickness of 3 mm or more.

As in the invention of EP 0 583 871A1, the reflecting layer is a layer of high refractive index, while the reflection enhancing layers are alternately of relatively low and high refractive indices. The reflecting layer is the layer which is, in use, furthest from the source of light to be reflected, and the reflection enhancing layers are between the light source and the reflection layer. It will be appreciated that the reflection enhancing layers may reflect more light than the reflecting layer.

The thickness of the reflection enhancing layers may be selected, in generally known manner, so that reflections from the interfaces between the reflection enhancing layer adjacent the glass (i.e. the inner reflection enhancing layer remote from the reflecting layer) and the glass and between the two reflection enhancing layers reinforce reflections from the face of the reflecting layer adjacent the intermediate reflection enhancing layer. This will occur when said inner and intermediate reflection enhancing layers each have an optical thickness of about $n\lambda/4$ wherein, in each case $\lambda$ is a wavelength of light in the visible region of the spectrum i.e. about 400 nm to 750 nm, and n is an odd integer; n may be the same or different for each of the said layers but is preferably 1 in each case.

The thickness of the reflecting layer may similarly be selected so that reflections from the face of the reflection layer adjacent the intermediate reflection enhancing layer (i.e. the interface between those two layers) are reinforced by reflections from the outer face of the reflecting layer. Unless the outer face of the reflecting layer is in contact with a layer of even higher refractive index, this will occur when the optical thickness of the reflection layer is about $n\lambda/4$ wherein $\lambda$ is a wavelength of light in the visible region of the spectrum and n is an odd integer, normally 1.

The desired high visible light reflection is most readily achieved, while avoiding an undesirably strong green tint in the reflection colour, by using silicon for both the reflecting layer (i.e. the outer layer of the reflecting coating) and as the inner (closest to the glass) reflection enhancing layer.

To control the tendency to a strongly green reflection colour, while at the same time achieving a high light reflection, an inner reflection enhancing layer of optical thickness less than 125 nm may be used and it is preferred to use an inner reflection enhancing layer of optical thickness less than 100 nm, and especially less than 90 nm (but more than 50 nm).

A particularly preferred inner reflection enhancing layer is a layer of silicon having a thickness in the range 14 nm to 19 nm.

The optical thickness of the reflecting layer is generally less critical than the thickness of the reflection enhancing layer, but will normally be over 100 nm and, in order to control the loss of light by absorption (especially when it is of silicon), less than 150 nm. In practice, it is found that increasing the optical thickness of the silicon reflecting layer, while maintaining the thickness of the reflection enhancing layers, tends to reduce the green tint of the reflection colour, i.e. increase a*, and a less green reflection may be achieved by using a silicon reflecting layer with an optical thickness greater than 125 nm.

A particularly preferred reflecting layer is a layer of silicon having a thickness greater than 20 nm and especially a thickness in the range 25 to 35 nm.

The refractive index of silicon may be as great as about 5 (see P J Martin, R P Netherfield, W G Sainty and D R McKenzie in Thin Solid Films 100 (1983) at pages 141–147) although lower values are often encountered.

It is known in the art that refractive index varies with wavelength. In this specification and claims, references to "refractive index" are intended to mean, in conventional manner, the refractive index for light of wavelength 550 nm (and, for the avoidance of doubt, it is hereby confirmed that the optical thicknesses referred to herein are optical thicknesses calculated from the refractive index for light of wavelength 550 nm).

It is believed that, in practice, the refractive index of silicon varies depending on the precise physical form of the silicon and the presence of any impurities, for example oxygen, nitrogen or carbon. For the purpose of the present invention, the presence of such impurities may be tolerated (and indeed, it is difficult in practice to produce on-line silicon coatings without significant oxygen and/or carbon incorporation) provided the refractive index is not reduced below about 2.8. Thus the term "silicon" as used herein with reference to layers of relatively high refractive index refers to material which is predominantly silicon, but may contain minor proportions of impurities, provided its refractive index is at least 2.8; preferably the refractive index of the silicon used is at least 3.0.

To achieve the desired reflection and colour, with the thin inner reflecting enhancing layer referred to above, the intermediate reflection enhancing layer adjacent the reflecting layer may have an optical thickness greater than 125 nm, and it is preferred to use an intermediate reflection enhancing layer of optical thickness greater than 140 nm (but normally less than 200 nm).

The reflection enhancing layer adjacent the reflecting layer should be of relatively low refractive index, generally a refractive index of less than 1.8 and preferably a refractive index of less than 1.6. For a high visible light reflection, it should be of a material which is substantially non-absorbing in the visible region of the spectrum. A suitable and convenient layer material is silicon oxide, which may however contain minor proportions of additional elements such as carbon or nitrogen, and the term "silicon oxide" is used herein to encompass silicon oxides containing such impurities. However, in order to obtain a high light transmission it is preferred to use a silicon oxide with a silicon:oxygen ratio approximately 1:2 and a low level of impurities such that its refractive index is below 1.6 and preferably below 1.5.

A particularly preferred intermediate reflection enhancing layer is a layer of silicon oxide having a thickness in the range 95 to 130 nm, although other materials of sufficiently low refractive index, for example aluminium oxide, can also be used.

As in EP 0 583 871 A1, the layers of the required refractive index may be applied to a ribbon of hot glass during the glass production processes by pyrolytic processes. It is generally convenient to use a chemical vapour deposition process to apply any silicon or silicon oxide layer that may be required. Thus, for example, a silicon layer may be deposited (directly or indirectly) on the hot glass substrate by chemical vapour deposition from a silane gas, conveniently in a gaseous diluent, for example nitrogen. It is generally most convenient to use monosilane, although other silanes may also be used, such as dichlorosilane. One suitable process for deposition of such a silicon layer is described in GB 1 507 996. If desired, for example to improve the alkali resistance of the silicon coating, the reactant gas may contain a proportion of a gaseous electron donating compound, especially an ethylenically unsaturated hydrocarbon compound, for example, ethylene, as additive (although use of high proportion of such compounds will normally be avoided as their presence tends to lead to incorporation of oxygen, believed to be from the glass, into the silicon coating with consequent reduction in refractive index).

A silicon oxide layer for use as a reflection enhancing layer of low refractive index (i.e. an intermediate layer) may similarly be deposited by chemical vapour deposition from a silane gas, conveniently in a gaseous diluent, in admixture with oxygen or a source of oxygen. A mixture of a silane and an ethylenically unsaturated hydrocarbon, together with carbon dioxide or an alternative oxygen compound which serves as a source of oxygen such as a ketone, for example acetone, may also be used. The relative concentrations of silane and the source of oxygen used will depend on the refractive index required; in general, the lower the refractive index required, the larger the proportion of oxygen-containing compound to silane to be used. Again, the silane used is preferably a monosilane.

When applying a coating layer to a ribbon of float glass, the chemical vapour deposition techniques can conveniently be carried out inside the float bath i.e. where the glass is supported on a molten metal bath under a protective atmosphere (but preferably after the glass has finished stretching i.e. at a glass temperature below 750° C.), or after the ribbon has emerged from the float bath. When using a gas containing monosilane to deposit silicon or silicon oxide layers, it is preferred to carry out the deposition of those layers in the float bath where the glass is at a temperature in the range 600° C. to 750° C. in order to achieve a satisfactory rate of deposition.

The preferred silicon and silicon oxide layers used in the practice of the present invention, while reflecting in the visible region of the spectrum, are substantially transparent in the infra red region so that their presence (unlike that of layers of silver traditionally used for mirrors) on the surface of the glass during annealing will not have any substantial detrimental effect on the annealing of the coated glass. This means that such mirrors can readily be produced on-line in a float glass process with the mirrors being annealed in known manner.

According to a further aspect of the present invention, there is provided a method of producing back surface mirrors comprising depositing onto a ribbon of hot glass during the glass production process two reflection enhancing layers followed by a reflecting layer the resulting mirrors have a visible light reflection of at least 65% with a reflection colour having an a* value of greater than −6.

The preferred silicon and silicon oxide layers used in the mirrors of the present invention have a high degree of chemical durability, so that, in contrast to conventional silver mirrors, the mirrors do not require chemical protection by a backing paint. However, silicon has limited scratch resistance and, if desired, an additional protective layer, for example of metal oxide, especially tin oxide, may be provided over the reflecting coating. This may conveniently be done by a pyrolytic coating technique applied, after deposition of the reflecting coating, during the glass production process. However, care may be required to avoid the conditions required detrimentally affecting the properties of a silicon reflecting layer and it may thus be appropriate to delay application of the protective tin oxide layer until after a surface layer of silicon oxide has been found on the silicon, for example as described in U.S. Pat. No. 4 661 381.

The mirrors of the present invention are useful for a wide range of purposes, including domestic use as mirrors in bathrooms and bedrooms. For many uses the mirrors will be provided with an obscuring layer, preferably a substantially opaque layer, over the reflecting coating.

Thus, according to a preferred aspect of the present invention, a rear surface mirror of the invention additionally comprises an opacifying layer. The opacifying layer may be a paint layer or a preformed member assembled against the coated glass.

When an opacifying paint is used to form a paint layer, it may be an alkyd resin based paint, optionally containing an amino resin, for example, melamine, and may have an organo silane primer incorporated therein. The paint will normally contain an opacifying agent, for example carbon black, preferably in an amount of at least 1.4% by weight, based on the weight of the dried paint. Because the reflecting coatings of the present invention are chemically durable, the paint may be lead-free.

The mirror coatings of the present invention are preferably deposited on a hot glass ribbon on-line during the glass production process. The coated ribbon is cut on-line to form individual mirrors, and will usually be further cut off-line to provide separate mirrors of the required size. An opacifying paint, which may be solvent based or water based, may be applied off-line, conveniently by a curtain coating process or a roller coating process and preferably before further cutting of the mirrors off-line. Alternatively, the opacifying paint may be applied on-line by a spray or roller process. Because the paint is not required to provide chemical durability, thin paint layers will suffice, so that paint layers thinner than 50 microns and preferably (for economy) thinner than 25 microns may be used (the thickness specified being dry thickness), a typical as-cured or dry thickness being 18 to 30 microns for curtain coated paints and 15±5 microns for roller or spray applied paints.

A primer layer may be applied to the mirror coating before paint is applied, or the paint may have a primer incorporated into the composition thereof. A suitable primer is an organo silane, and a particularly suitable primer for use with alkyd based paints is an organosilane having amino end groups, such as an aminopropyltrimethoxysilane. That primer is stable in water and wets the underlying surface to be painted. It may be applied as a 1–2% aqueous solution in deionised water. Alternatively, when the organo silane primer is incorporated into the paint, the primer is preferably present in an amount of from 1 to 6% by weight based on the weight of the paint at a typical solids content of around 62%, most preferably around 1% by weight. The application of paints to mirror coatings of the kind generally described in EP 0 583 871A1 is more fully discussed in WO 95/18774.

Alternatively, the opacifying layer may be in the form of a preformed member assembled against the coated glass. Such a preformed member may be a plastics film adhered to the coated side of the mirror, or may be a separate ply assembled against the coated side of the glass, for example a board having a dark, e.g. black painted face, against the coated glass.

In the production of mirrors according to the invention, a coated ribbon may be cut on-line to form individual mirrors, and will usually be further cut off-line to provide separate mirrors of the required size. The opacifying member may be assembled onto the mirrors off-line preferably before further cutting of the mirrors off-line.

The opacifying member preferably comprises a self-adhesive plastics film (enabling a safety backed product to be achieved). The plastics film is translucent or opaque and carries a translucent or (when the film is translucent) an opaque pressure-sensitive adhesive. Carbon black is preferably present in the adhesive as an opacifier. The adhesive is preferably an acrylic-based adhesive. The plastics film is preferably a polyolefin film, such as a film of polyethylene or polypropylene, and is preferably biaxially oriented. Such biaxial orientation can enhance the impact performance of the safety backed mirror. Alternatively, the plastics film may comprise a polyester film. The films may be clear and transparent, or coloured. A most preferred film is a polypropylene film carrying an acrylic adhesive which in its pressure-sensitive form is known for use with polyester films employed for use in imparting bomb-blast protection or solar control to glazings, which adhesive is known to be compatible with glass. A typical self-adhesive film has a total thickness of around 90 microns, the plastics film and the adhesive having respective approximate thicknesses of 60 and 30 microns.

The adhesion between the rear surface of the mirror and the self-adhesive plastics film may be enhanced by the use of a primer which is applied to the reflecting coating before the application of the self-adhesive plastics film thereover. The primer is preferably an organosilane, preferably having amino or epoxy end groups, and in particular the primer may be aminopropyltrimethoxysilane in aqueous solution. That primer is stable in deionised water and wets the underlying surface to be covered by the self-adhesive film. It may be applied as a 2% aqueous solution in deionised water.

In an alternative embodiment of the present invention, the opacifying member comprises a separate lamina having a face assembled in contact with the back surface of the mirror. Preferably, the opacifying member of the mirror assembly comprises a board having a darkened surface, most preferably a matt surface, which is assembled, for example, by the use of framing members or other mechanical attachments to the back surface of the mirror. The board may for example comprise hardboard painted with a black matt paint with the painted surface assembled, for a back surface mirror, adjacent to the reflecting coating of the mirror. Alternatively, the opacifying member may comprise black paper.

In each of those specified embodiments, the opacifying member is assembled together with the glass substrate carrying the reflecting coating to form a unitary mirror assembly as a composite assembly. However, in a further alternative embodiment the opacifying member may comprise a wall of a building, preferably having a darkened surface adjacent the mirror, and the mirror assembly of the present invention comprises the glass substrate carrying the reflecting coating assembled onto the wall. The use of opacifying members in mirror assemblies in which the reflecting coatings may be of the kind generally described in EP 0 583 871A1 is more fully discussed in WO 95/18773.

Reverting to the structure of the reflecting coating, the skilled man will appreciate that additional low and high refractive index quarter wave ($n\lambda/4$, where n is an odd integer, preferably 1) layers may be added to the stack of layers forming the reflecting coating to further enhance the reflection.

It may also be possible to incorporate additional non-quarter wave layers between the said inner and outer layers, although in that event such layers are generally best regarded as forming part of a composite intermediate layer which should, considered as a composite single layer, have a thickness such that the phase differences of the light reflected from the interface of said composite intermediate layer and the inner reflection enhancing layer reinforce light reflected from the interface between the composite intermediate layer and the reflecting layer. Similarly, an additional layer may be included between the inner layer and the glass although it will then normally be of refractive index intermediate between the refractive index of the inner layer and the glass.

BRIEF DESCRIPTION OF THE DRAWINGS

The invention is illustrated but not limited by the following schematic drawings and description thereof and the following Examples. In the drawings:

FIG. 4 is a representation of the arrangement of coating stations on a float glass production line for production of mirrors in accordance with the method of the present invention.

FIG. 5 is a section through a gas distributor suitable for use at any of the coating stations 15, 16 and 17 indicated in FIG. 4 for depositing a layer of the reflecting coating used in the present invention by chemical vapour deposition.

DETAILED DESCRIPTION OF THE PREFERRED EMBODIMENTS OF THE INVENTION

Figure 1:
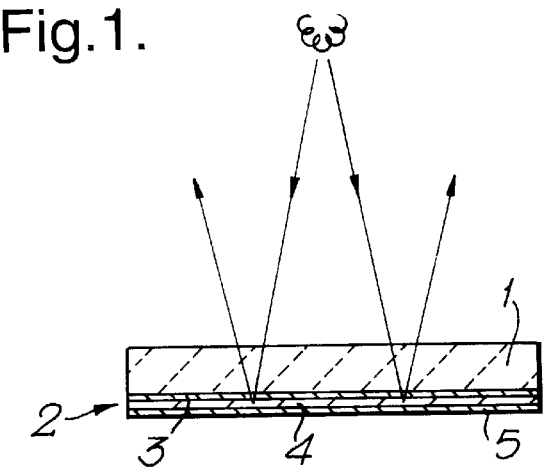
FIG. 1 is a section through a mirror in accordance with the invention.

Referring to FIG. 1, a back surface mirror comprises a float glass substrate 1 carrying a reflecting coating 2 comprising an inner reflection enhancing layer 3 of silicon, an intermediate reflection enhancing layer 4 of silicon oxide and an outer reflection layer 5 of silicon. The layer thicknesses may be as discussed above. The production of such mirrors having a visible light reflection of at least 65% and a reflection colour having an a* value greater than −6 is described in the following Example.

Figure 2:
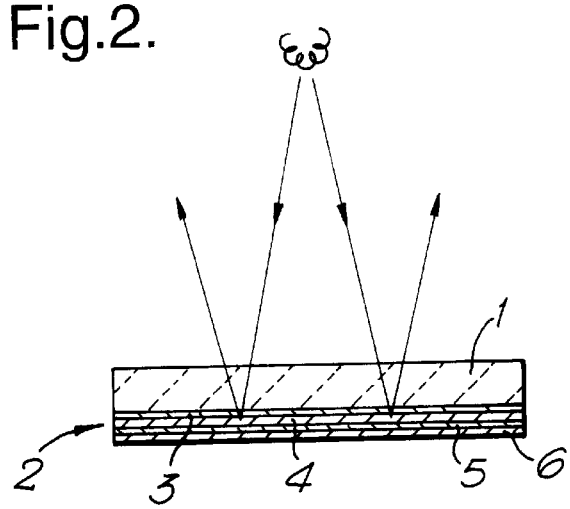
FIG. 2 is a section through a mirror as illustrated in FIG. 1 with the addition of a protective layer, or an opacifying layer in the form of a paint or plastics film, over the reflecting coating.
Figure 3:
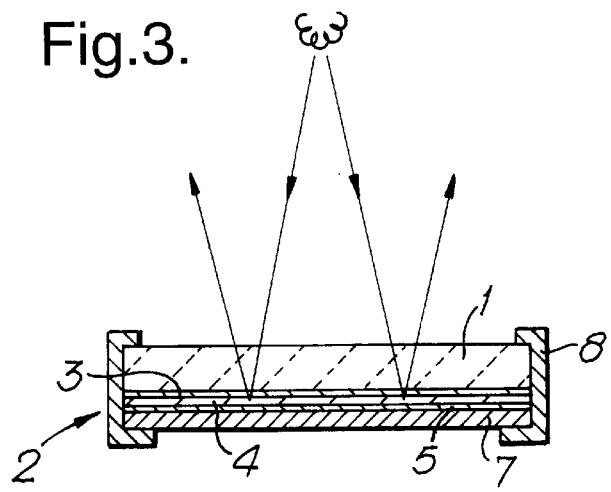
FIG. 3 is a section through a mirror as illustrated in FIG. 1 with the addition of an opacifying layer in the form of a separate ply over the reflecting coating.

In FIGS. 2 and 3, the same numerals are used to designate the same substrate and layers as in FIG. 1. In addition FIG. 2 shows an additional layer 6 which may be a protective layer (for example a thin layer of tin oxide) or opacifying layer in the form of a paint layer or self-adhesive plastics film (when layer 6 is an opacifying layer, it will normally be substantially thicker than the other layers shown). FIG. 3 shows an opacifying layer 7 in the form of a board which preferably has a darkened surface adjacent the glass assembled by means of a frame 8 against the coated surface of the glass.

FIG. 4 illustrates diagrammatically a float glass production line comprising a glass melting section 11, a float bath section 12 for forming the molten glass into a continuous ribbon, a lehr section 13 for annealing the said glass ribbon and a warehouse section 14 for cutting pieces of glass from the ribbon for storage and/or distribution and use. For the production of mirrors in accordance with the invention, each of the three coating stations for respectively applying the inner, intermediate and outer layers will normally be located in or between the float bath section 12 and lehr section 13; in the illustrated embodiment of the inventions, the said three coating stations 15, 16, 17 are arranged in the float bath section 12 as shown in FIG. 4. The location of each coating station is selected to be at a position where the glass ribbon has substantially reached its final thickness (usually below a glass temperature of around 750° C.) so that it is not subject to further stretching which might crack any coating layer applied, but (at least for the inner and intermediate layers) where its temperature remains sufficiently high for formation of a further pyrolytic layer.

Referring to FIG. 5, a dual flow coating gas distributor beam, generally designated 20, useful for the practice of the present invention comprises a framework 21, formed by spaced inner and outer walls 22 and 24, defining enclosed cavities 26 and 28 through which a suitable heat exchange medium is circulated for maintaining the distributor beam at a desired temperature. Gaseous precursors supplied through a fluid cooled supply conduit 30 extending along the distributor beam are admitted through drop lines 32 spaced along the supply conduit to a delivery chamber 34 within a header 36 carried by the framework 20. Precursor gases admitted through the drop lines 32 are discharged from the delivery chamber 34 through a passageway 38 toward and along the surface of the glass 18 (shown in the form of a ribbon floating on a bath of molten tin 19) both upstream and downstream (with respect to the direction of ribbon movement) in the direction of the arrows in FIG. 5. Baffle plates 40 may be provided within the delivery chamber for equalizing the flow of precursor materials across the distributor beam to assure that the materials are discharged against the glass in a smooth, laminar, uniform flow entirely across the beam. Spent precursor materials, as well as a certain amount of the surrounding atmosphere around the beams, are collected and removed through exhaust chambers 42 along the sides of the distributor beam. Various types of suitable distributor devices for chemical vapour deposition are generally known in the prior art as disclosed, for example, in U.S. Pat. Nos. 4 469 045, 4 504 526 and 5 065 696.

The following Examples illustrate the present invention without limiting it. In the Examples, mirrors were produced on-line using a float glass production line having coating gas distributors arranged at the coating stations 15, 16 (2 distributors) and 17 shown in FIG. 4. In the Examples the gas flows where stated by volume are measured at ambient temperature and a pressure of 1 bar, and all gas flows are quoted per meter width of ribbon coated.

EXAMPLE 1

Glass mirrors, for use as back surface mirrors, were produced using a laminar vapour coating process. Four separate equi-spaced coating beams as illustrated in FIG. 5 were used to apply successive silicon (1 beam), silicon oxide (2 beams) and silicon layers (1 beam) to a ribbon of clear float glass having a thickness of 4 mm and advancing at a lehr speed of 555 meters/hour. Each of the coating beams was located in the float bath where the glass ribbon was supported on a bath of molten metal, with the upstream (with reference to the direction of glass advance) beam located at a position where the glass temperature was approximately 710° C.

The four coating beams were fed with the gas mixtures shown below:

|   | $SiH_4$ | Ethylene | $O_2$ | $N_2$ |
| --- | --- | --- | --- | --- |
| 1 (Upstream) | 1.3 | — | — | 120 |
| 2 | 2.0 | 12 | 8 | 150 |
| 3 | 2.0 | 12 | 8 | 150 |
| 4 (Downstream) | 6.5 | 1 | — | 120 |

No modification of the lehr conditions was required to anneal the resulting coated ribbon, which had a highly reflecting appearance. Individual mirrors were cut from the ribbon by cutting in conventional fashion and the optical properties measured using an Illuminant D65 Source 1931 Observer Conditions on the uncoated side of the glass with the following results.

The visible light reflection was found to be 73.5% with the reflected light having an a* value of −5.1 and a b* value of +0.6.

The a* value was somewhat lower than the preferred minimum value of −5, but (in common with the other optical properties measured) was in good agreement with the value calculated for a coated glass having the observed combination of layer thickness and refractive indices (the inner, reflection enhancing layer had a thickness of 18 nm and a refractive index of 4.4; the intermediate, reflection enhancing layer had a thickness of 105 nm and a refractive index of 1.46, and the outer, reflection, layer had a thickness of 19 nm and a refractive index of 4.3). The same theory predicts that, for a coating comprising an inner, reflection enhancing layer of silicon of thickness 18 nm, an intermediate reflection enhancing layer of silicon oxide of thickness 110 nm, and an outer reflection layer of silicon of thickness 25 nm and with the refractive indices of the layers being as specified above, the corresponding values would be:

| Visible light reflection | 74% |
| --- | --- |
| a* −3.8, b* +2.3 | | showing that the preferred coatings of the invention may similarly be produced by minor modification of the layer thicknesses.

A mirror produced substantially in accordance with the above Example (but having a visible light reflection of 74% with a* −5.0, b* +0.9), was backed with a 200 micron black polyethylene film carrying a pressure sensitive solvent based acrylic adhesive applied over the coating. The application of the backing results in a small change in the optical properties and a measured visible light reflection of 72.5%, with a* −5.6, b* +0.1.

Thus it can be seen that the present invention permits the on-line production of back surface mirrors of high durability, and having a reflection colour close to neutral and close to that of a conventional silver mirror (a*=−2.5, b*=+1.5, when formed on the base float glass used in the foregoing Example).

EXAMPLE 2

The procedure of Example 1 was repeated except that the 4 mm clear float glass ribbon was advanced at a lehr speed of 690 meters/hour, that dual flow beams 1 (upstream), and 4 (downstream) were replaced by uniflow laminar coating beams of the kind described in EP 0 305 102B, and dual flow beam 2 was replaced by a modified version of such a uniflow laminar coating beam in which the water cooling is replaced by oil cooling, the graphite blocks by metal blocks, and the gas flow restrictor by a sequence of baffle plates corresponding to that used in the dual flow beams. The gas flows were as shown below (quoted in liters per minute for beams 1, 2 and 3 and kilograms per hour for beam 4 except for acetone in beam 2 which is quoted in cc of liquid acetone per minute):

|   | $SiH_4$ | Ethylene | Acetone | $O_2$ | $N_2$ |
| --- | --- | --- | --- | --- | --- |
| 1 (Upstream) | 1.4 |  |  |  | 23 |
| 2 | 5.7 | 11.4 | 4.4 |  | 19.6 |
| 3 | 2 | 12 |  | 8 | 149 |
| 4 (Downstream) | 0.36 | 0.029 |  |  | 2.6 |

The resulting coated glass had a visible light reflection of 70% with the reflected light having an a* value of −5.8 and a b* value of 0.7. The thicknesses and refractive indices of the individual layers were 19 nm, 4.4 (inner reflection enhancing layer), 80 nm, 1.46 (intermediate reflection enhancing layer) and 25 nm, 4.3 (reflecting layer).

EXAMPLE 3

The procedure of Example 1 was repeated except that the 4 mm clear float glass ribbon was advanced at a lehr speed of 750 meters/hour, that dual flow beams 1 (upstream) and 4 (downstream) were replaced by uniflow laminar coating beams of the kind described in EP 0 305 102B, and the gas flows were as shown below (quoted in liters per minute for beams 1, 2 and 3, and kilograms per hour for beam 4):

|   | $SiH_4$ | Ethylene | $O_2$ | $N_2$ + He |
| --- | --- | --- | --- | --- |
| 1 (Upstream) | 1.6 |  |  | 23 |
| 2 | 2.6 | 15.4 | 5.1 | 74 + 74 |
| 3 | 2.6 | 15.4 | 5.1 | 74 + 74 |
| 4 (Downstream) | 0.6 | 0.31 |  | 2.6 |

The resulting coated glass had a visible light reflection of 73% with the reflected light having an a* value of −2.6 and a b* value of +3.2. The thicknesses and refractive indices of the individual layers were 18 nm, 4.5 (inner reflection enhancing layer), 101 nm, 1.45 (intermediate reflection enhancing layer), 30 nm, approximately 4 (reflecting layer).

Increasing the thickness of the silicon reflecting layer (compare Examples 1, 2 and 3) not only increases the a* value (so that it becomes less negative), but also increases the b* value. Market research has shown that increased b* values are readily acceptable to the consumer, and preferred mirrors in accordance with the invention have a* values in the range −4 to −2, and b* values in the range 2.5 to 4.5, preferably accompanied by a light reflection of at least 72%.

I claim:

1. A back surface mirror comprising a glass substrate having a thickness of greater than 2 mm carrying a reflecting coating comprising a reflecting layer and at least two reflection enhancing layers, the thicknesses and refractive indices of the layers of said reflecting coating being selected to provide a visible light reflection of at least 65% with a reflection colour having an a* value greater than −6; wherein the reflection enhancing layer closest to said glass substrate is a silicon layer having an optical thickness of less than 125 nm.

2. A back surface mirror according to claim 1 wherein the thickness and refractive indices of the layers of the coating are selected to provide a reflection colour having an a* value greater than −5.

3. A back surface mirror according to claim 1 wherein the reflection enhancing layer closest to said glass substrate has an optical thickness of less than 100 nm.

4. A back surface mirror according to claim 1 wherein the reflection enhancing layer closest to said glass substrate is a layer of silicon having a thickness in the range 14 nm to 19 nm.

5. A back surface mirror according to claim 1 wherein the intermediate reflection enhancing layer has an optical thickness greater than 125 nm.

6. A back surface mirror according to claim 1 wherein the reflection enhancing layer not closest to said glass substrate has an optical thickness greater than 140 nm.

7. A back surface mirror according to claim 1 wherein the intermediate reflection enhancing layer is a layer of silicon oxide.

8. A back surface mirror according to claim 7 wherein the intermediate reflection enhancing layer is a layer of silicon oxide having a thickness in the range 95 nm to 130 nm.

9. A back surface mirror according to claim 1 wherein the reflecting layer is a layer of silicon.

10. A back surface mirror according to claim 1 with an opacifying layer over the reflecting layer.

11. A back surface mirror according to claim 10 wherein the opacifying layer is a paint layer.

12. A back surface mirror according to claim 10 wherein the opacifying layer is an opacifying member in the form of a plastics film adhered to the back side of the mirror.

13. A back surface mirror comprising a glass substrate carrying an inner reflection enhancing layer of silicon of optical thickness less than 100 nm, an intermediate reflection enhancing layer of silicon oxide of optical thickness greater than 140 nm and an outer reflecting layer of silicon.

14. A method of producing back surface mirrors comprising depositing onto a ribbon of hot glass of thickness greater than 2 mm during the glass production process an inner reflection enhancing layer of silicon having an optical thickness less than 125 nm and a second reflection enhancing layer followed by a reflecting layer, the resulting mirrors have a visible light reflection of at least 65% with a reflection colour having an a* value of greater than −6.

\* \* \* \* \*